United States Patent

Meduvsky et al.

[11] Patent Number: 5,529,334
[45] Date of Patent: Jun. 25, 1996

[54] AIR BAG INFLATOR AND METHOD OF ASSEMBLY

[75] Inventors: Alex G. Meduvsky, Warren; George W. Goetz, Rochester Hills, both of Mich.

[73] Assignee: TRW Vehicle Safety Systems Inc., Lyndhurst, Ohio

[21] Appl. No.: 436,588

[22] Filed: May 8, 1995

[51] Int. Cl.$^6$ ............................................. B60R 21/30
[52] U.S. Cl. .................. 280/738; 280/732; 280/728.2
[58] Field of Search ..................... 280/737, 741, 280/728.2, 732

[56] References Cited

U.S. PATENT DOCUMENTS

| | | | |
|---|---|---|---|
| 3,938,826 | 2/1976 | Giorgini et al. | 280/738 |
| 4,950,458 | 8/1990 | Cunningham | 422/164 |
| 5,087,070 | 2/1992 | O'Loughlin et al. | 280/740 |
| 5,100,172 | 3/1992 | Van Voorhies et al. | 280/738 |
| 5,201,542 | 4/1993 | Thuen et al. | 280/736 |
| 5,221,107 | 6/1993 | O'Loughlin | 280/736 |
| 5,226,670 | 7/1993 | Wright et al. | 280/738 |
| 5,358,272 | 10/1994 | Kokeguchi | 280/738 |

*Primary Examiner*—Kenneth R. Rice
*Attorney, Agent, or Firm*—Tarolli, Sundheim, Covell, Tummino & Szabo

[57] ABSTRACT

An inflator (14) for inflating an inflatable vehicle occupant restraint (12) includes ignitable gas generating material, an igniter (260) for igniting the gas generating material, and a housing (50) having a tubular wall (52) surrounding the gas generating material. The housing (50) further has an end wall (54) defining a closed end of the housing (50). The housing (50) contains a tubular structure (62) including a cylindrical filter (70) for the gas. The tubular structure (62) extends coaxially within the tubular wall (52) and has an axially inner end portion (180) adjacent to the end wall (54). A sealing structure engages the tubular structure (62) to block gas from bypassing the filter (70) by flowing around the inner end portion (180) of the tubular structure (62). The sealing structure includes a pair of opposed sealing surfaces (94, 150) which extend circumferentially around the axis (40) and which face radially toward each other. The inner end portion (180) of the tubular structure (62) is compressively engaged by, and is compressed between, the opposed sealing surfaces (94, 150).

21 Claims, 7 Drawing Sheets

5,529,334

AIR BAG INFLATOR AND METHOD OF ASSEMBLY

FIELD OF THE INVENTION

The present invention relates to an apparatus for inflating an inflatable vehicle occupant restraint, such as an air bag, and further relates to a method of assembling the apparatus.

BACKGROUND OF THE INVENTION

U.S. Pat. No. 4,817,828 discloses an apparatus for inflating an inflatable vehicle occupant restraint such as an air bag. The apparatus includes an inflator which comprises a source of gas for inflating the air bag. A body of ignitable gas generating material is contained in the inflator. The gas generating material is ignited when the vehicle experiences a condition that indicates the occurrence of a collision for which inflation of the air bag is desired. The collision-indicating condition may comprise, for example, the occurrence of a predetermined amount of vehicle deceleration. As the gas generating material burns, it generates a large volume of gas which is directed to flow from the inflator into the air bag to inflate the air bag. When the air bag is inflated, it extends into the vehicle occupant compartment to restrain an occupant of the vehicle from forcefully striking parts of the vehicle.

The inflator disclosed in the '828 patent has a cylindrical housing. The housing includes an inner tubular wall and an outer tubular wall. A cylindrical filter is contained in the housing concentrically between the tubular walls. The inner tubular wall defines a cylindrical combustion chamber in which the body of gas generating material is contained. A plurality of gas flow openings extend through the inner tubular wall and direct the gas to flow radially outward from the combustion chamber and through the filter toward the outer tubular wall. A plurality of gas flow openings extending through the outer tubular wall similarly direct the gas to flow radially outward from the housing toward the air bag.

In the inflator disclosed in the '828 patent, the housing is closed at its axially opposite ends by a pair of circular end walls. The end walls extend diametrically across the open ends of the tubular walls. Each end wall has an annular peripheral flange, and is held in place by a respective end portion of the outer tubular wall which is crimped around the flange. The closed ends of the housing are sealed by a pair of elastomeric sealing rings. Each of the sealing rings is located inside the housing adjacent to a respective one of the end walls.

SUMMARY OF THE INVENTION

In accordance with the present invention, an apparatus for inflating an inflatable vehicle occupant restraint comprises an ignitable gas generating material, an igniter means and a housing. The igniter means, when actuated, ignites the gas generating material. The gas generating material then generates gas for inflating the vehicle occupant restraint. The housing has a tubular wall surrounding the gas generating material. The tubular wall has a longitudinal central axis and a plurality of outlet openings through which the gas flows radially outward. The housing further has an end wall defining a closed end of the housing.

A tubular structure is contained in the housing. The tubular structure comprises a cylindrical filter through which the gas flows radially outward from the gas generating material toward the outlet openings. The tubular structure extends coaxially within the tubular wall, and has an axially inner end portion adjacent to the end wall.

The apparatus further comprises a sealing means which engages the inner end portion of the tubular structure to block gas from bypassing the filter by flowing around the inner end portion of the tubular structure. The sealing means includes a pair of opposed sealing surfaces which extend circumferentially around the central axis and which face radially toward each other. The inner end portion of the tubular structure is compressively engaged by, and is compressed between, the opposed sealing surfaces.

In a first embodiment of the present invention, one of the sealing surfaces is located on the tubular housing wall. The other sealing surface is located on a cylindrical body which extends concentrically within the tubular housing wall. The cylindrical body has a chamfered end portion. When the apparatus is assembled, the tubular structure is moved longitudinally into the tubular housing wall toward and against the chamfered end portion of the cylindrical body. The chamfered end portion of the cylindrical body then directs the inner end portion of the tubular structure to move concentrically over the cylindrical body and into the space between the opposed sealing surfaces upon further axial movement of the tubular structure into the housing.

When the inner end portion of the tubular structure is moved concentrically over the cylindrical body, the chamfered end portion of the cylindrical body causes the inner end portion of the tubular structure to become radially compressed between the opposed sealing surfaces on the cylindrical body and the tubular housing wall. A significant amount of axial compression also occurs as the inner end portion of the tubular structure is forcefully pressed between the opposed sealing surfaces. The inner end portion of the tubular structure is thus compressed, and is maintained in a condition of compressive loading, around its entire circumference between the cylindrical body and the tubular housing wall.

In the first embodiment of the present invention, the cylindrical body is defined by a spacer which is received in the housing in a position adjoining the end wall of the housing. In a second embodiment of the present invention, the cylindrical body is defined by a portion of the housing that projects axially from the end wall of the housing.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
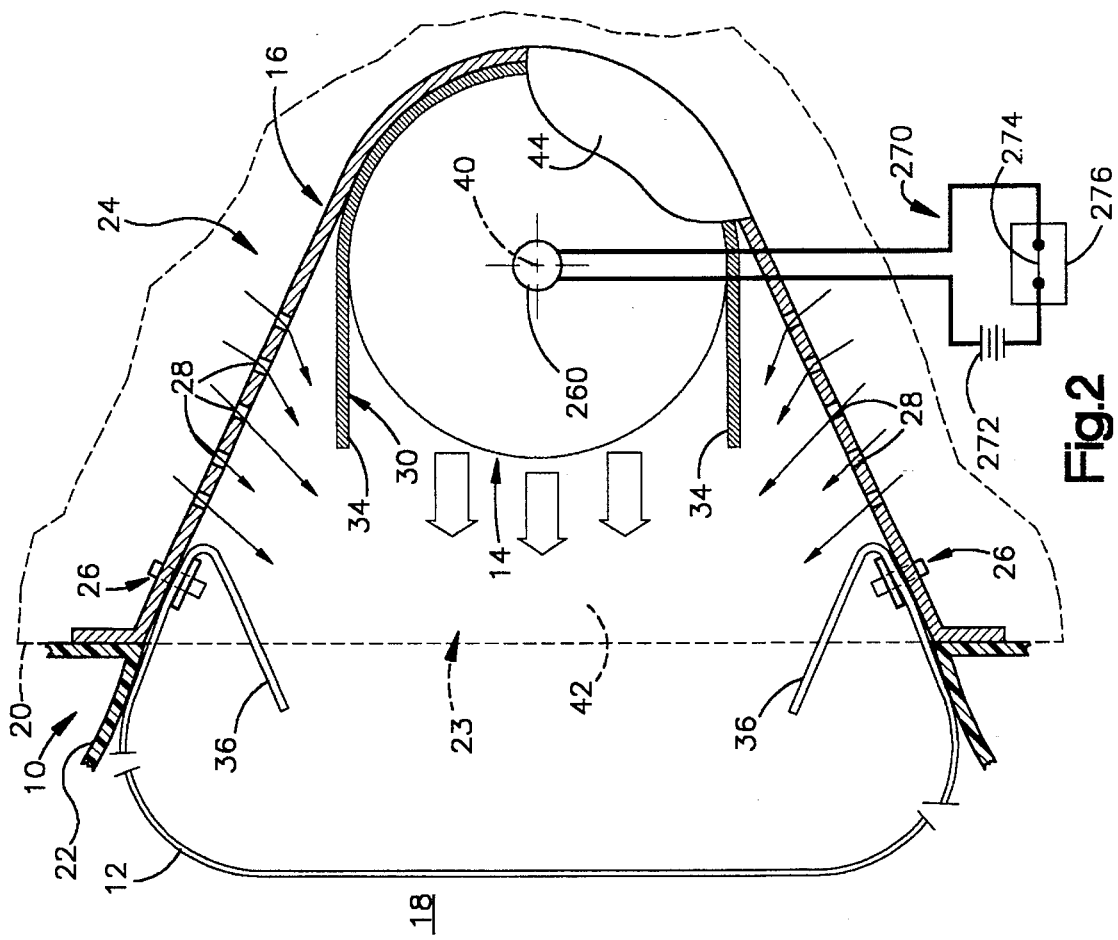
FIG. 1 is a schematic view of a vehicle occupant restraint apparatus comprising a first embodiment of the present invention.
Figure 2:
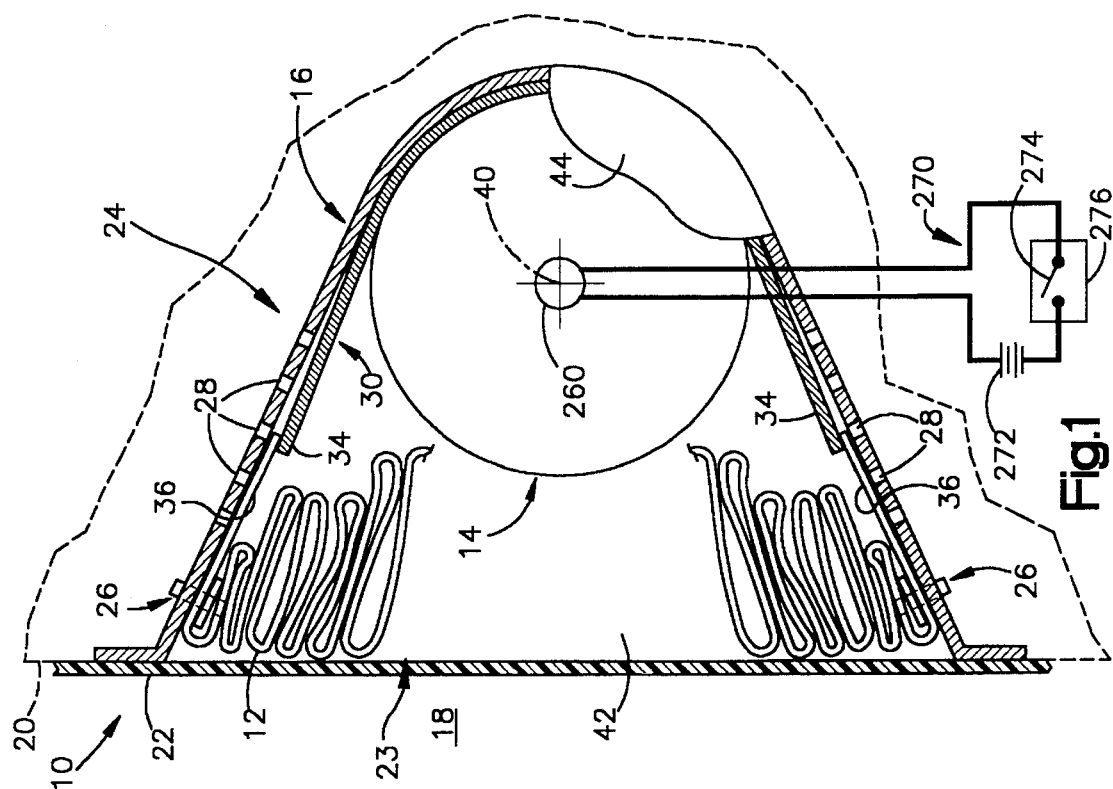
FIG. 2 is a schematic view showing the apparatus of FIG. 1 in an actuated condition.

A vehicle occupant restraint apparatus 10 comprising a first embodiment of the present invention is shown schematically in FIGS. 1 and 2. The apparatus 10 includes an inflatable vehicle occupant restraint 12 which is commonly referred to as an air bag. The apparatus 10 further includes an inflator 14 which comprises a source of gas for inflating the air bag 12.

The air bag 12 and the inflator 14 are housed in a reaction canister 16. The reaction canister 16 is mounted in a part of a vehicle that adjoins the vehicle occupant compartment 18, such as the instrument panel 20 of the vehicle. A deployment door 22 extends over a deployment opening 23 in the reaction canister 16. The deployment door 22 continues the trim theme of the instrument panel 20 across the deployment opening 23, and thus conceals the air bag 12 and the reaction canister 16 from the vehicle occupant compartment 18. The air bag 12, the inflator 14, the reaction canister 16 and the deployment door 22 are parts of an air bag module 24 which is assembled separately from the instrument panel 20.

When the vehicle experiences a collision for which inflation of the air bag 12 is desired to restrain an occupant of the vehicle, the inflator 14 is actuated. The inflator 14 then emits a large volume of gas which flows into the air bag 12 to inflate the air bag 12 from a stored, folded condition (FIG. 1) to an inflated condition (FIG. 2). As the gas begins to inflate the air bag 12, it moves the air bag 12 outwardly against the deployment door 22. A stress riser (not shown) in the deployment door 22 ruptures under the stress induced by the increasing pressure of the gas flowing into the air bag 12 from the inflator 14. As the gas continues to inflate the air bag 12, it moves the air bag 12 outward through the deployment opening 23 past the deployment door 22, as shown in FIG. 2. The air bag 12 then extends into the vehicle occupant compartment 18 to restrain an occupant of the vehicle from forcefully striking the instrument panel 20 or other parts of the vehicle.

The air bag 12 is connected to the reaction canister 16 by suitable clamping assemblies 26. A plurality of ambient air flow openings 28 extend through the reaction canister 16 between the inflator 14 and the air bag 12. A sheet 30 of foil or the like provides a pair of flaps 34 extending from the inflator 14 over several of the ambient air flow openings 28. Additional flaps 36, which preferably comprise edge portions of the air bag 12, extend from the clamping assemblies 26 over the remainder of the ambient air flow openings 28.

As shown schematically in FIGS. 1 and 2, the inflator 14 has a cylindrical shape with a longitudinal central axis 40, and extends axially between two opposite side walls 42 and 44 of the reaction canister 16. As shown in greater detail in FIG. 3, the inflator 14 has a cylindrical housing 50. The housing 50 has a tubular outer wall 52 and a circular end wall 54, each of which is centered on the axis 40. The end wall 54 closes one end of the housing 50, and supports a threaded mounting stud 58 for mounting the inflator 14 in the reaction canister 16. A circular end cap 56 closes the other end of the housing 50. The end cap 56 also is centered on the axis 40.

The housing 50 contains an elongated cylindrical body 60 of ignitable gas generating material. The housing also contains a tubular structure 62. The tubular structure 62 defines a cylindrical combustion chamber 64 in which the body 60 of gas generating material is located.

Figure 4:
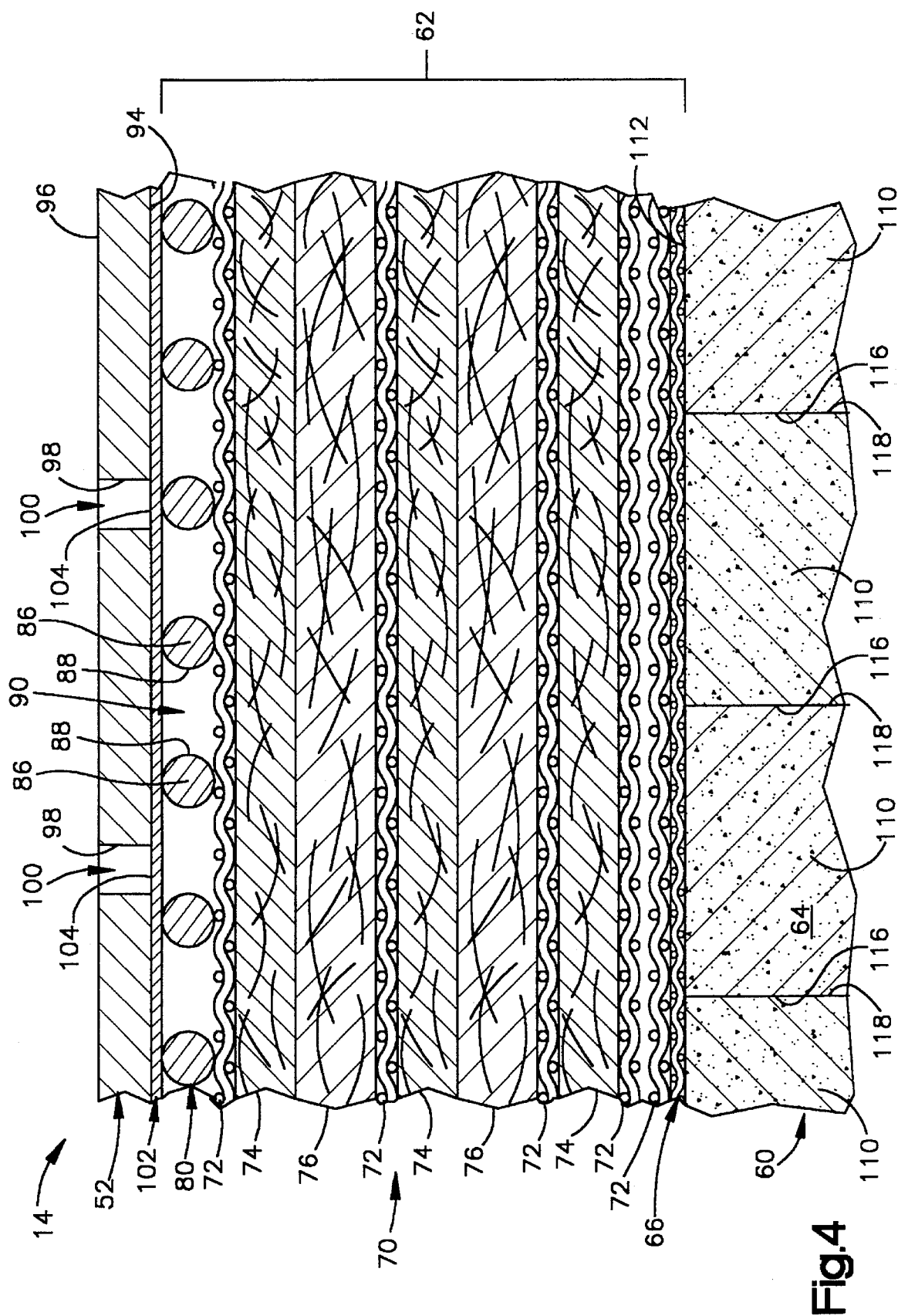
FIG. 4 is an enlarged sectional view of parts shown in FIG. 3.

As shown in enlarged detail in FIG. 4, the combustion chamber 64 is defined by a cylindrical wire mesh screen 66 which defines the inner diameter d of the tubular structure 62. Alternatively, the combustion chamber 64 could be defined by a perforated tubular inner body wall, as known in the art. The tubular structure 62 includes a generally cylindrical filter 70 which extends circumferentially around the combustion chamber 64. The filter 70 has a plurality of generally cylindrical filter layers, including a radially innermost layer defined by the screen 66, and further including layers 72 of wire mesh screen, layers 74 of steel wool, and layers 76 of ceramic/glass wool.

The tubular structure 62 further includes a support member 80. The support member 80 is a strand of metal wire which extends circumferentially and axially over the filter 70. More specifically, the support member 80 has opposite ends 82 and 84 (FIG. 3) which are fixed to the filter 70 by welds (not shown), and extends over the filter 70 in a helical configuration. The support member 80 thus has a plurality of successive sections 86 (FIG. 4) which are shaped as helical turns extending over the filter 70 circumferentially entirely around the axis 40. The helical sections 86 of the support member 80 have opposed helical surface portions 88 which are spaced from each other axially to define a gap 90. The gap 90 likewise extends over the filter 70 circumferentially entirely around the axis 40 in a plurality of helical turns. The gap 90 is open and free of obstructions axially across its width and circumferentially along its entire length. The width of the gap 90 can be varied, and is preferred to be substantially greater than the widths of the openings in the underlying layers 72 of wire mesh screen in the filter 70.

The tubular outer wall 52 of the housing 50 has a cylindrical inner side surface 94, a cylindrical outer side surface 96, and a plurality of cylindrical inner edge surfaces 98 which define gas outlet openings 100 extending radially through the outer wall 52. A sheet 102 of rupturable pressure controlling material, which is preferably formed of aluminum foil, extends circumferentially around the inner side surface 94 of the outer wall 52 in continuous contact with the inner side surface 94. The sheet 102 thus has a plurality of individual circular portions 104, each of which extends across the inner end of a respective one of the gas outlet openings 100 in the outer wall 52.

The sheet 102 of rupturable pressure controlling material is preferably adhered to the inner side surface 94 of the outer wall 52 of the housing 50 before the tubular structure 62 is installed in the housing 50. The tubular structure 62, which includes the filter 70, is then moved longitudinally into the housing 50 through the open end of the tubular outer wall 52. When the tubular structure 62 is thus moved into the housing 50, the support member 80 slides against the sheet 102 of rupturable pressure controlling material in helical line contact. The line contact helps prevent the outermost layer 72 of wire mesh screen in the filter 70 from tearing the sheet 102 of rupturable pressure controlling material.

The elongated body 60 of gas generating material is defined by a plurality of separate, coaxial cylindrical bodies 110 of gas generating material which are known as grains. The gas generating material of which the grains 110 are formed is an ignitable material which rapidly generates a large volume of gas when ignited. The gas generating material may have any suitable composition known in tile art, and the grains 110 may have any suitable configuration known in the art.

Figure 5:
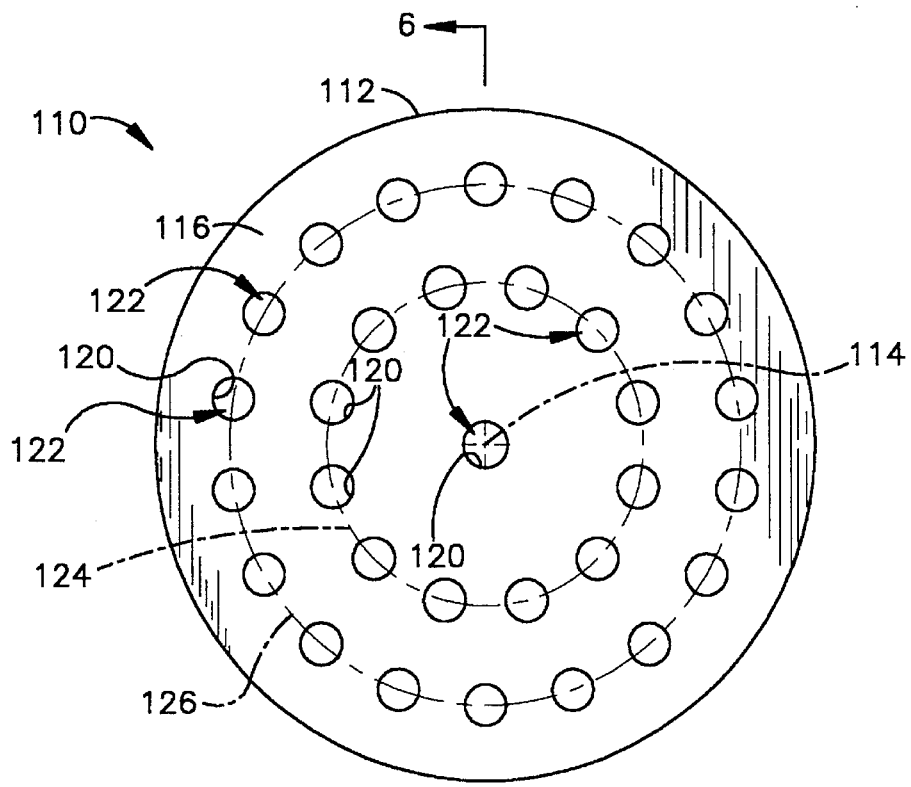
FIG. 5 is an enlarged view of a part shown in FIG. 3.
Figure 6:
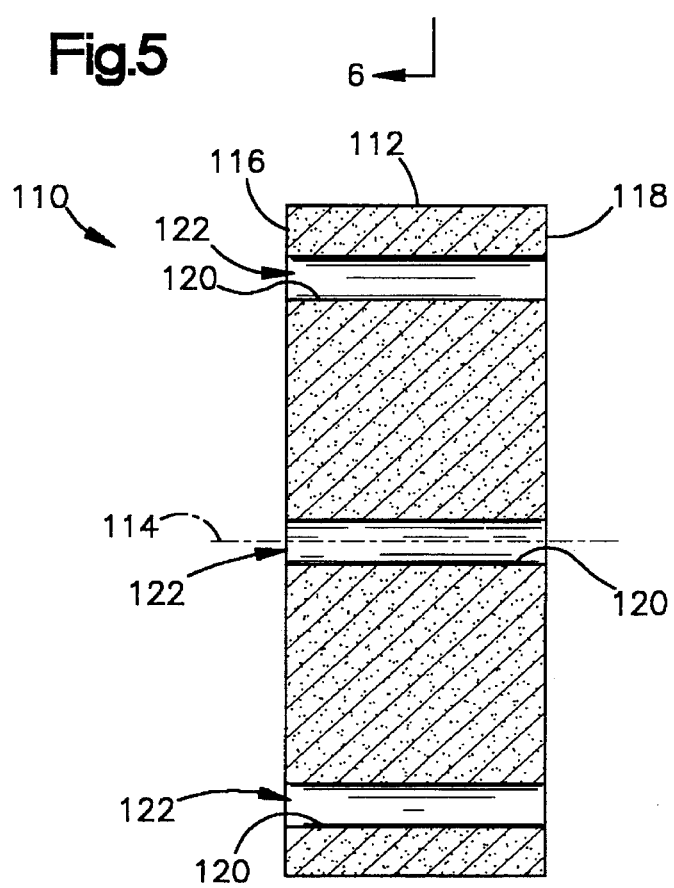
FIG. 6 is a view taken on line 6—6 of FIG. 5.

As an example of the different grains of gas generating material that may be used in the inflator 14, the configuration of one such grain 110 is shown in detail in FIGS. 5 and 6. The grain 110 has a cylindrical outer surface 112 centered on an axis 114. The grain 110 further has first and second opposite side surfaces 116 and 118. Each of the opposite side surfaces 116 and 118 has a circular shape centered on the axis 114, and is generally perpendicular to the axis 114.

The grain 110 preferably has a plurality of cylindrical inner surfaces 120, each of which defines a respective cylindrical passage 122 extending axially through the grain 110. The number and arrangement of the cylindrical inner surfaces 120 may vary. As shown by way of example in FIGS. 5 and 6, one of the cylindrical inner surfaces 120 is centered on the axis 114, and the other cylindrical inner surfaces 120 are arranged in first and second circular arrays. The first circular array of the cylindrical inner surfaces 120 extends circumferentially around the axis 114 on a first circular line 124. The first circular line 124 is centered on the axis 114. The second circular array of the cylindrical inner surfaces 120 extends circumferentially around the axis 114 on a second circular line 126. The second circular line 126 also is centered on the axis 114, and is spaced radially outward from the first circular line 124. Moreover, each of the cylindrical inner surfaces 120 in the second circular array is at least partially offset circumferentially from each of the cylindrical inner surfaces 120 in the first circular array.

Each of the grains 110 of gas generating material preferably has an ignition-enhancing coating formed of a pyrotechnic material. The pyrotechnic material of which the coatings are formed does not generate a significant amount of gas for inflating the air bag 12, but is more readily ignitable than the gas generating material of which the grains 110 are formed. The pyrotechnic material may have any suitable composition known in the art. Alternatively, the grains 110 of gas generating material could be free of such coatings.

Figure 7:
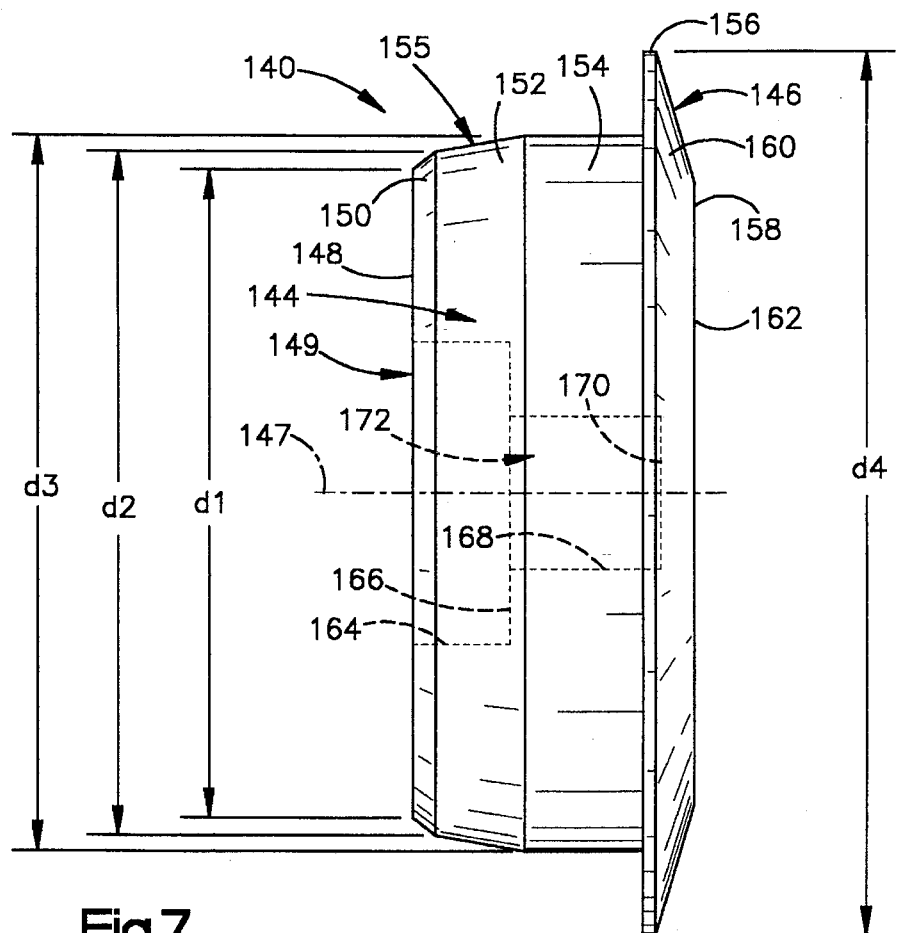
FIG. 7 is a view of another part shown in FIG. 3.

A circular spacer 140 also is contained in the housing 50. As shown in FIG. 7, the spacer 140 has a cylindrical body 144 and a circular flange 146, each of which is centered on an axis 147. The body 144 includes an annular front, end surface 148 of the spacer 140. The front end surface 148 is perpendicular to the axis 147, and defines a circular opening 149 centered on the axis 147. The body 144 further includes three outer surfaces 150, 152, and 154 of the spacer 140 which extend circumferentially around the axis 147.

Figure 3:
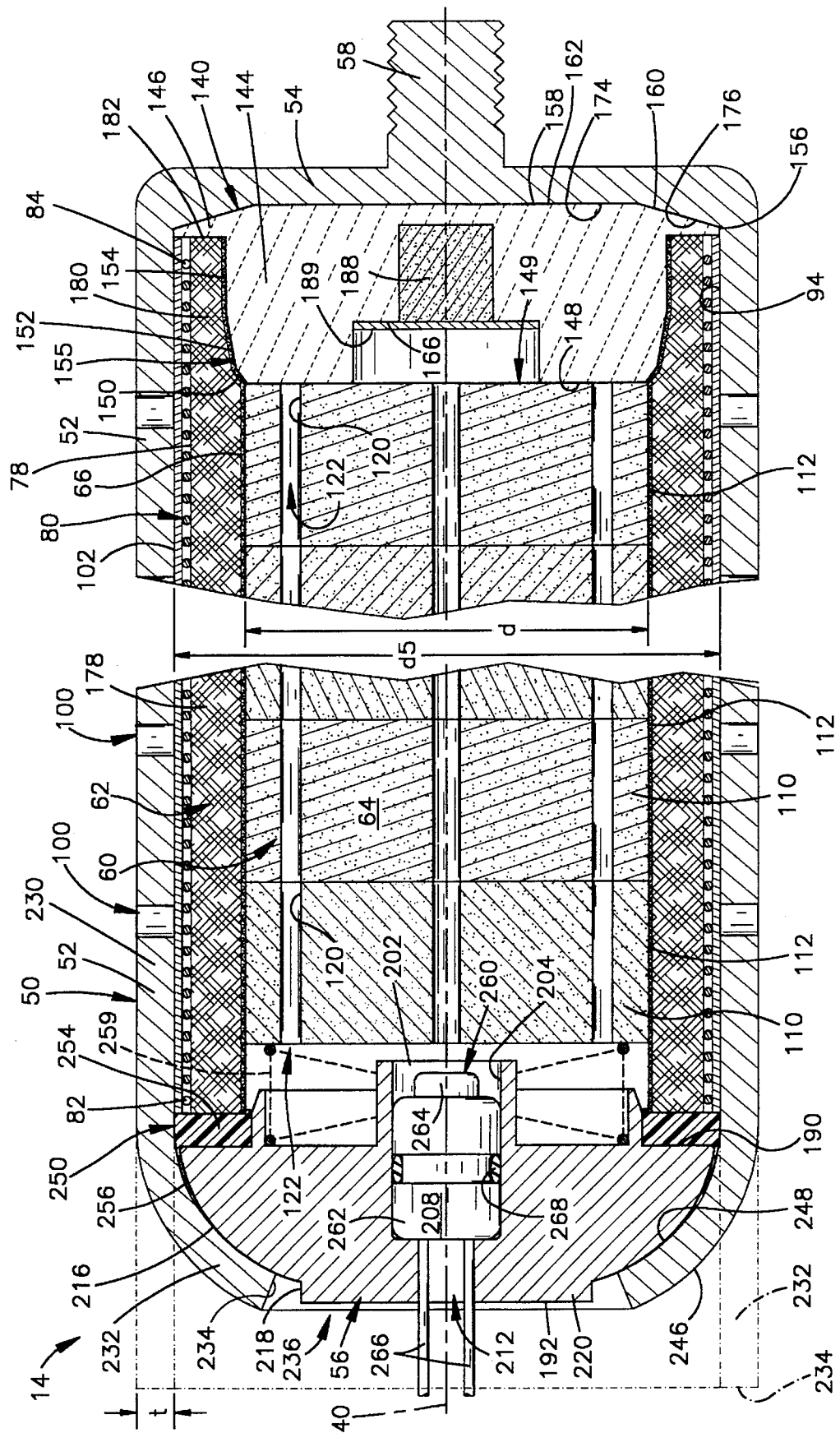
FIG. 3 is a sectional view of parts of the apparatus of FIG. 1.

The first outer surface 150 of the spacer 140 has a frusto-conical shape and extends a short distance axially inward, and radially outward, from the front end surface 148. The first outer surface 150 thus has a first diameter d1 and a second diameter d2. The first diameter d1 is slightly less than the inner diameter d of the tubular structure 62 at the combustion chamber 64 (FIG. 3). The second diameter d2 is slightly greater than the inner diameter d of the tubular structure 62. In the first embodiment of the present invention shown in the drawings, the first outer surface 150 extends radially outward at an angle of approximately 45° to the axis 147, but that angle could vary.

The second outer surface 152 of the spacer 140 also has a frusto-conical shape, and extends axially inward, and radially outward, from the first outer surface 150. The diameter of the second outer surface 152 thus increases from the second diameter d2 to a third, slightly greater diameter d3. The axial length of the second outer surface 152 is substantially greater than the axial length of the first outer surface 150. However, the angle at which the second outer surface 152 extends radially outward is substantially less than the angle at which the first outer surface 150 extends radially outward. The second outer surface 152 thus extends radially outward at an angle of approximately 10° to the axis 147, but that angle also could vary.

As a result of their frusto-conical shapes, the first and second outer surfaces 150 and 152 of the spacer 140 together define a chamfered end portion 155 of the body 144. The third outer surface 154 of the spacer 140 is cylindrical, and extends axially from the chamfered end portion 155 to the flange 146. The third outer surface 154 thus has a uniform diameter which is equal to the greatest diameter d3 of the second outer surface 152. As indicated in FIG. 7, the length of the third outer surface 154 is approximately equal to the combined axial lengths of the first and second outer surfaces 150 and 152. That dimension also could vary.

The flange 146 on the spacer 140 projects radially outward from the third outer surface 154 on the body 144, and has an annular outer edge surface 156 which is centered on the axis 147. The diameter d4 of the outer edge surface 156 is substantially equal to the inner diameter d5 of the tubular outer housing wall 52 (FIG. 3). A rear side surface 158 of the spacer 140 has a frusto-conical portion 160 extending radially inward from the outer edge surface 156 of the flange 146. The rear side surface 158 further has a planar circular portion 162 extending diametrically across the axis 147.

A first cylindrical inner surface 164 of the body 144 extends axially inward from the opening 149 to an annular inner surface 166. A second cylindrical inner surface 168 extends axially inward from the annular inner surface 166 to a circular inner surface 170. The second cylindrical inner surface 168 and the circular inner surface 170 together define a central compartment 172 which is open in a direction facing axially outward toward the opening 149 at the front end surface 148.

The spacer 140 is received coaxially within the housing 50, as shown in FIG. 3. The planar rear surface portion 162 of the spacer 140 abuts a substantially coextensive planar inner surface portion 174 of the end wall 54. The frusto-conical rear surface portion 160 of the spacer 140 abuts a substantially coextensive frusto-conical inner surface portion 176 of the end wall 54. Additionally, the annular outer edge surface 156 of the flange 146 closely adjoins the cylindrical inner side surface 94 of the outer wall 52 circumferentially entirely around the axis 40. The spacer 140 is thus seated closely against the end wall 54 in a position centered on the axis 40.

As described briefly above, the tubular structure 62 is moved longitudinally into the housing 50 through the open end of the outer wall 52 along the axis 40 toward the end wall 54. As shown in FIG. 3, the tubular structure 62 has a major portion 178, and has an inner end portion 180 with an annular inner end surface 182. When the tubular structure 62 approaches the end wall 54, the inner end portion 180 of the tubular structure 62 moves against the spacer 140. The inner end portion 180 is then pressed forcefully against the spacer 140. The process of pressing the tubular structure 62 forcefully into the housing 50 is described fully below with reference to the end cap 56 at the opposite end of the housing 50. A result of that process is shown in FIG. 3 where the tubular structure 62 is shown to be engaged with the spacer 140.

Specifically, the inner end portion 180 of the tubular structure 62 is moved axially over the spacer 140 from the first outer surface 150 to the flange 146, and is thus received concentrically over the spacer 140 as shown in FIG. 3. The inner diameter d of the tubular structure 62 is less than the second diameter d2 (FIG. 7) of the first outer surface 150 of the spacer 140. Therefore, the inner end portion 180 of the tubular structure 62 is forcefully compressed radially when it is moved axially inward against the first outer surface 150 of the spacer 140. The inner end portion 180 of the tubular structure is further compressed radially as it continues to be moved axially inward over the second outer surface 152 of the spacer 140. As described above, the second outer surface 152 has a substantially lesser angle of inclination to the axis 40. Therefore, the additional compression caused by the second outer surface 152 is substantially less than the initial amount of compression caused by the first outer surface 150. The inner end portion 180 of the tubular structure 62 continues to be compressed in this manner until the inner end surface 182 reaches the flange 146.

In addition to the radial compression, a significant amount of axial compression results from the friction that resists sliding movement of the tubular structure 62 axially along the outer surfaces 150–154 of the spacer 140 and the inner surface 94 of the tubular housing wall 52. Further axial compression can result from the force with which the inner end surface 182 is pressed against the flange 146. Such compression of the tubular structure 62 is enabled by the compressibility of the wire mesh screen, the steel wool, and the ceramic/glass wool of which the various layers of the tubular structure 62 are formed. The inner end portion 180 of the tubular structure 62 is thus compressed, and is maintained in a condition of compressive loading, around its entire circumference by and between the surrounding surfaces of the adjoining parts of the inflator 14.

As a result of the compressive loading in the radial direction, the radially inner-most screen 66 in the tubular structure 62 is pressed against the outer surfaces 150–154 of the spacer 140 firmly enough to block a flow of gas from leaking axially outward from the combustion chamber 64 between the tubular structure 62 and the spacer 140. As a result of the compressive loading in the axial direction, the gas is further blocked from leaking radially outward between the inner end surface 182 of the tubular structure 62 and the flange 146 on the spacer 140. Additionally, the axial and radial compression causes the permeability of the screen 66 and the other filter layers 72, 74 and 76 to be reduced substantially. Therefore, gas from the combustion chamber 64 does not leak past the filter 70 by flowing around and/or superficially through the inner end portion 180 of the tubular structure 62. The combustion chamber 64 is thus sealed at its axially inner end without the use of an elastomeric seal such as an O-ring or the like.

The compartment 172 at the center of the spacer 140 contains an optional body 188 of auto-ignition material. The body 188 of auto-ignition material is held in the compartment 188 by a sheet 189 of metal foil or the like which is adhered to the annular inner surface 166 of the spacer 140. The auto-ignition material ignites and emits combustion products automatically at a predetermined elevated temperature, and may have any suitable composition known in the art. The combustion products emitted from the body 188 of auto-ignition material rupture the sealing sheet 189 and emerge from the spacer 140 through the opening 149. Those combustion products thus move against the adjacent grain 110 of gas generating material in the combustion chamber 64 to ignite the elongated body 60 of gas generating material automatically when the ambient temperature of the inflator 14 reaches the predetermined elevated level.

Figure 8:
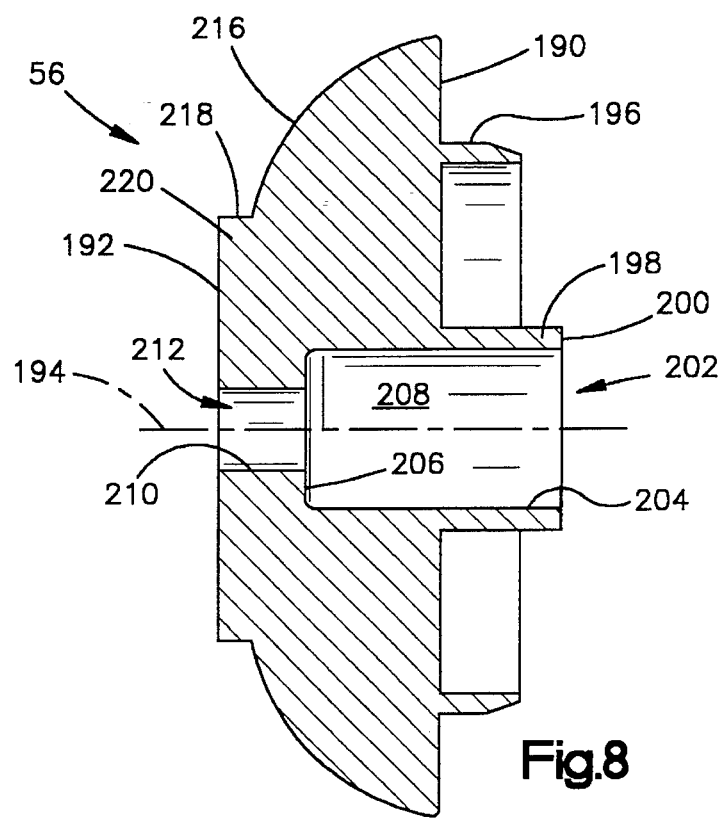
FIG. 8 is a view of still another part shown in FIG. 3.

As best shown in FIG. 8, the end cap 56 has oppositely facing inner and outer side surfaces 190 and 192 which are centered on an axis 194. The end cap 56 further has first and second cylindrical wall portions 196 and 198 which are centered on the axis 194. Each of the cylindrical wall portions 196 and 198 projects axially from the inner side surface 190, with the first cylindrical wall portion 196 being shorter than, and spaced radially outward from, the second cylindrical wall portion 198. An annular end surface 200 of the second cylindrical wall portion 198 defines a circular opening 202 centered on the axis 194.

A first cylindrical inner surface 204 of the end cap 56 extends axially from the opening 202 to an annular inner surface 206. A cylindrical compartment 208 is thus defined between the opening 202 and the annular inner surface 206. A second cylindrical inner surface 210 of the end cap 56 extends axially from the annular inner surface 206 to the outer side surface 192. The second cylindrical inner surface 210 defines an axially extending passage 212 which communicates the compartment 208 with the exterior of the end cap 56 at the outer side surface 192.

The end cap 56 further has first and second peripheral surface portions 216 and 218. The first peripheral surface portion 216 has an arcuate cross sectional profile extending radially inward, and axially outward, from the inner side surface 190. The first peripheral surface portion 216 of the end cap 56 thus has the contour of a dome which is centered on the axis 194.

The second peripheral surface portion 218 of the end cap 56 extends a short distance axially outward from the first peripheral surface portion 216 to the outer side surface 192. The second peripheral surface portion 218 is annular, and thus defines the length of a short axial projection 220 on which the front side surface 192 is located.

As further shown in FIG. 3, the outer wall 52 of the housing 50 has a major portion 230 and an open end portion 232. The major portion 230 of the outer wall 52 is cylindrical and extends axially over the tubular structure 62. The open end portion 232 of the outer wall 52 has an arcuate cross sectional profile extending radially inward, and axially outward, from the major portion 230. The open end portion 232 thus has the contour of a dome centered on the axis 40. The open end portion 232 further has an annular edge surface 234 which defines a circular opening 236 centered on the axis 40.

The end cap 56 is closely received coaxially within the outer wall 52 of the housing 50. Specifically, the open end portion 232 of the outer wall 52 closely overlies the first peripheral surface portion 216 of the end cap 56, and the annular edge surface 234 of the outer wall 52 encircles the second peripheral surface portion 218 of the end cap 56. The short projecting portion 220 of the end cap 56 is thus received in, and extends diametrically across, the opening 236.

As indicated in dot-dash lines in FIG. 3, the open end portion 232 of the outer wall 52 initially has the cylindrical shape of the major portion 230 of the outer wall 52. When the end cap 56 has been moved coaxially into the housing 50, the open end portion 232 of the outer wall 52 is deformed radially and axially inward over the end cap 56. This process provides the open end portion 232 of the outer wall 52 with a dome-shaped contour closely matching that: of the first peripheral surface portion 216 of the end cap 56, and thus causes the open end portion 232 to overlie the peripheral surface portion 216 closely. Preferably, the open end portion 232 overlies the peripheral surface portion 216 in contact with a substantial area of the peripheral surface portion 216, and most preferably with an area that extends circumferentially entirely around the axis 40.

Figure 9:
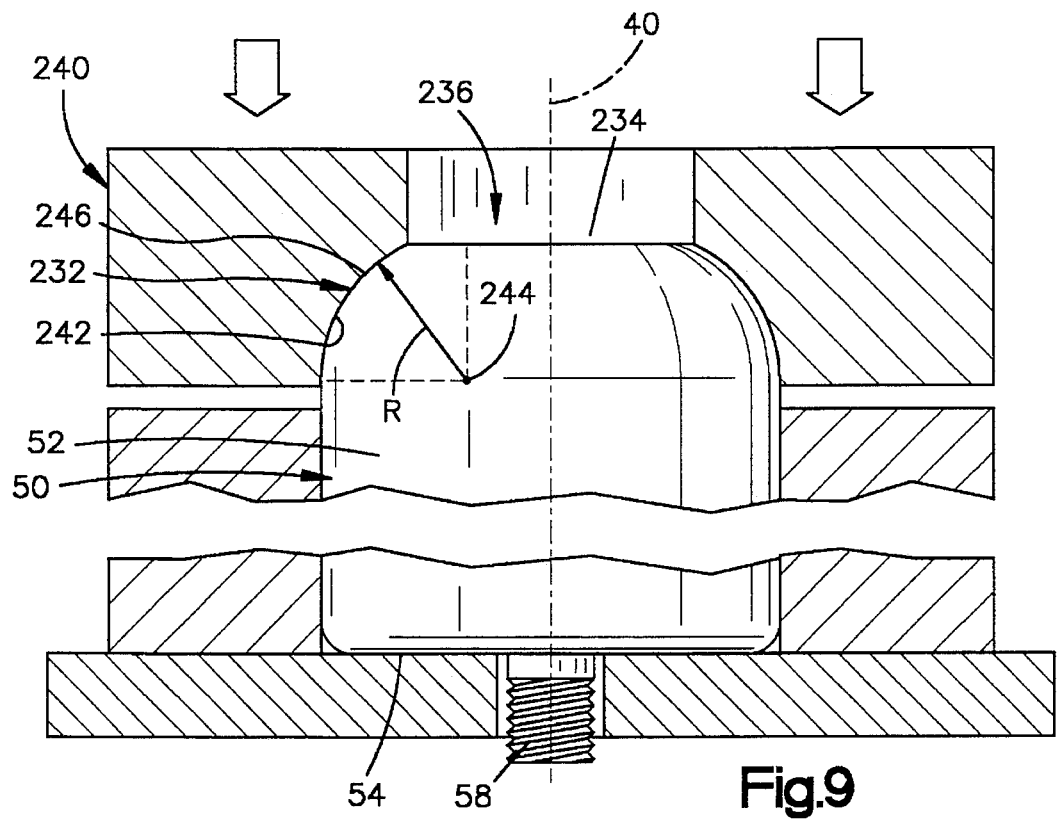
FIG. 9 is a schematic view of an apparatus used for assembling the apparatus of FIG. 1.

Such deformation of the outer wall 52 can be accomplished with any suitable technique known in the art. However, as shown schematically in FIG. 9, this is preferably accomplished by pressing a die 240 axially against the open end portion 232 of the outer wall 52. The die 240 has an arcuate inner surface portion 242 with a radial profile centered on a point 244. The radial profile of the inner surface portion 242 has a radius of curvature R, and extends approximately 65°–75° circumferentially about the center point 244. When the open end portion 232 of the outer wall 52 of the housing 50 is deformed in the die 240, the outer surface 246 of the open end portion 232 is provided with a radial profile matching that of the inner surface portion 242 of the die 240. The radial profile of the outer surface 246 then has the radius of curvature R, and extends approximately 65°–75° circumferentially about the center point 244. Accordingly, the arcuate extent of the dome-shaped contour of the open end portion 232 of the outer wall 52 is approximately 65°–75°. By maintaining that parameter of the open end portion 232 less than or equal to 90°, the housing 50 can be made of an impact extruded metal which has less ductility, such as aluminum, rather than steel. This is because the more brittle material is found not to fail structurally when bent into a dome-shaped configuration with an arcuate extent not greater than 90°, whereas it is more likely to crack or otherwise fail structurally if bent beyond that limit.

An additional parameter to be considered in the design of the open end portion 232 of the outer wall 52 is a relationship between the radius of curvature R and the thickness of the outer wall 52. Preferably, the ratio of the radius of curvature R (FIG. 9) to the thickness t (FIG. 3) of the outer wall 52 is at least approximately 3.75. For example, in a preferred embodiment of the present invention, the radius of curvature R is 19 mm., the thickness t is 4.6 mm., and the ratio of the radius of curvature R to the thickness t is 4.13. Maintaining this parameter of the open end portion 232 at or above a value of approximately 3.75 ensures that the aluminum or other material of the open end portion 232 will not fail structurally when deformed into a dome-shaped configuration as described above.

Figure 10:
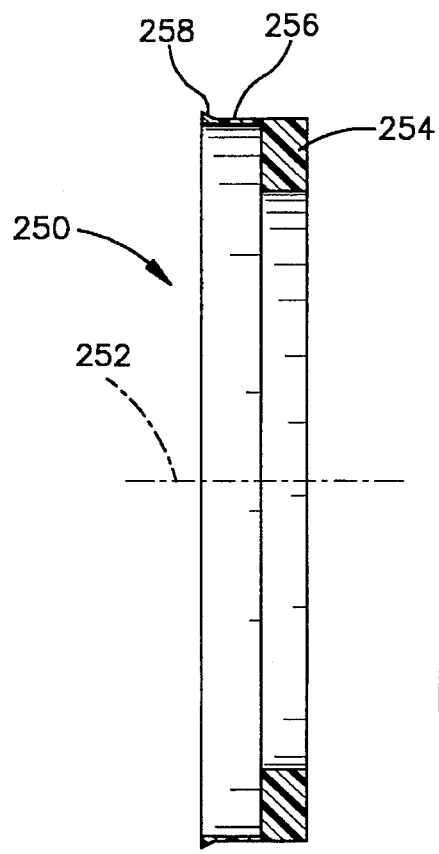
FIG. 10 is a view of yet another part shown in FIG. 3.

An annular elastomeric seal 250 also is contained in the housing 50. As shown in FIG. 10, the seal 250 has a central axis 252, a body portion 254 with a rectangular cross section, and a lip portion 256 projecting axially from the body portion 254. The lip portion 256 of the seal 250 has a narrow radial thickness, as compared with the body portion 254, and includes a small flange 258 projecting radially outward at its free end.

The seal 250 is received in the housing 50 as shown in FIG. 3. The body portion 254 of the seal 250 is received coaxially over the first cylindrical wall portion 196 of the end cap 56, and extends radially outward to the outer wall 52 of the housing 50. The body portion 254 of the seal further extends axially inward from the inner side surface 190 of the end cap 56 to the tubular part 62 of the inflator 14. The lip portion 256 of the seal 250 extends axially and radially between the dome-shaped peripheral surface portion 216 of the end cap 56 and the dome-shaped end portion 232 of the outer wall 52. When the end portion 232 of the outer wall 52 is deformed radially and axially inward as described above, the body portion 254 and the lip portion 256 of the seal 250 are both compressively loaded between the surrounding surfaces of the adjoining parts of the inflator 14. As a result, the seal 250 fills the space through which gas might otherwise escape from the combustion chamber 64 and leak outward through the opening 236.

As described above, the open end portion 232 of the outer wall 52 of the housing 50 is deformed into a configuration having a dome-shaped contour closely matching the dome-shaped contour of the peripheral surface portion 216 of the end cap 56. The curvature of the peripheral surface portion 216 is thus preferred to be the same as the curvature taken by the inner surface 248 of the open end portion 232 upon deformation of the open end portion 232. However, the curvatures of the peripheral surface 216 and the inner surface 248 may differ somewhat. This is because the seal 250 blocks the gas from leaking into any space that might extend between those surfaces as a result of a difference in their curvatures.

When the seal 250 is compressively loaded between the surrounding surfaces of the adjoining parts of the inflator 14 in the foregoing manner, a substantial force is transmitted axially from the end cap 56 to the tubular structure 62 through the seal 250. The tubular structure 62 is thus pressed forcefully into the housing 50 along the axis 40 toward the end wall 54. As described above with reference to the spacer 140, this causes the inner end portion 180 of the tubular structure 62 to be compressed between the spacer 140 and the outer wall 52 of the housing 50.

A coil spring 259 (shown schematically) is received closely within the first cylindrical wall portion 196 of the end cap 56, and extends axially from the inner side surface 190 of the end cap 56 to the first grain 110 of gas generating material adjacent to the end cap 56. The coil spring 259 is compressed axially between the end cap 56 and the first grain 110 of gas generating material, and thus presses the grains 110 of gas generating material together firmly enough to prevent them from rattling within the housing 50.

The inflator 14 further includes an igniter 260 which is supported by the end cap 56. The igniter 260 is a squib of known construction and, as shown in FIG. 3, has a cylindrical metal casing 262 which is received in the compartment 208 in the end cap 56. The casing 262 has a rupturable forward end portion 264 adjacent to the opening 202 in the end cap 56. A pair of lead wires 266 extend from the casing 262 to the exterior of the housing 50 through the passage 212 in the end cap 56.

The casing 262 contains a pyrotechnic material which has a known composition and which is ignited upon the passage of electric current through the igniter 260 between the lead wires 266. When the pyrotechnic material in the casing 262 is ignited, it produces combustion products which rupture the forward end portion 264 of the casing 262 and emerge from the casing 262. An elastomeric O-ring 268 provides a hermetic seal between the casing 262 and the first cylindrical inner surface 204 of the end cap 56. The end cap 56 and the O-ring 268 thus support the igniter 260 in a position from which it will spew the combustion products outward from the casing 262 and through the opening 202.

When the inflator 14 is installed in the reaction canister 16 as shown in FIGS. 1 and 2, the igniter 260 is included in an electrical circuit 270. The electrical circuit 270 further includes a power source 272, which is preferably the vehicle battery and/or a capacitor, and a normally open switch 274. The switch 274 is preferably part of a collision sensor 276 which senses a vehicle condition indicative of a collision for which inflation of the air bag 12 is desired to restrain an occupant of the vehicle. The collision-indicating condition may comprise, for example, a predetermined amount of vehicle deceleration. The collision sensor 276 closes the switch 274 upon sensing such a collision-indicating condition.

When the switch 274 in the circuit 270 is closed, electric current passes through the igniter 260 between the lead wires 266 (FIG. 3). The pyrotechnic material in the igniter 260 is then ignited and, as described above, the igniter 260 spews combustion products through the opening 202 in the end cap 56. The combustion products emerging from the opening 202 move against and ignite the first grain 110 of gas generating material adjacent to the end cap 56.

When the first grain 110 of gas generating material is ignited, it rapidly generates gas for inflating the air bag 12. It also produces and emits additional combustion products including heat and hot particles. Some of those combustion products move into contact with second grain 110. As a result, the second grain 110 also is ignited and, in turn, emits additional combustion products. This process continues along the length of the elongated body 60 of gas generating material as all of the grains 110 of gas generating material are ignited successively. The ignitable surface areas provided by the cylindrical inner surfaces 120, and the fluid communication provided by the passages 122, promote rapid ignition of the grains 110 in this manner. The elongated body 60 of gas generating material is thus ignited quickly along its entire length so that gas for inflating the air bag 12 is generated quickly along the entire length of the elongated body 60.

The gas generated upon combustion of the gas generating material flows radially outward from the combustion chamber 64 through the cylindrical screen 66. The gas is then cooled and filtered as it continues to flow radially outward through the layers 72–76 of the filter 70. The gas is at first confined within the housing 50 by the sheet 102 of rupturable pressure controlling material. When the pressure of the gas acting radially outward against the sheet 102 reaches a predetermined elevated level, it ruptures the circular portions 104 of the sheet 102 which extend across the inner ends of the gas outlet openings 100 in the outer wall 52. The gas then flows radially outward through the gas outlet openings 100.

In accordance with a particular feature of the present invention, the spacer 140 is formed of a non-metallic material, and is most preferably formed of a ceramic material. In comparison with a metallic material, the nonmetallic material of the spacer 140 absorbs and conducts a lesser amount of heat from the combustion chamber 64 upon combustion of the body 60 of gas generating material. This prevents the gas generated in the combustion chamber 64 from being cooled excessively by the spacer 140 and/or the end wall 54 of the housing 50.

As indicated schematically by the large arrows in FIG. 2, the gas flowing radially outward from the inflator 14 is directed toward the air bag 12 by the reaction canister 16. This flow of gas causes a reduction in the gas pressure inside the reaction canister 16 adjacent to the flaps 34 and 36. The reduction in the gas pressure inside the reaction canister 16 causes ambient air outside the reaction canister 16 to flow inward through the ambient air flow openings 28 and past the flaps 34 and 36, as indicated schematically by the small arrows in FIG. 2. The ambient air mixes with the gas in the reaction canister 16 and cools the gas. The ambient air also augments the flow of gas into the air bag 12, and thus reduces the amount of gas which must be generated by the gas generating material in the inflator 14. The air bag 12 is thus inflated into vehicle occupant compartment 18 to restrain an occupant of the vehicle.

Figure 11:
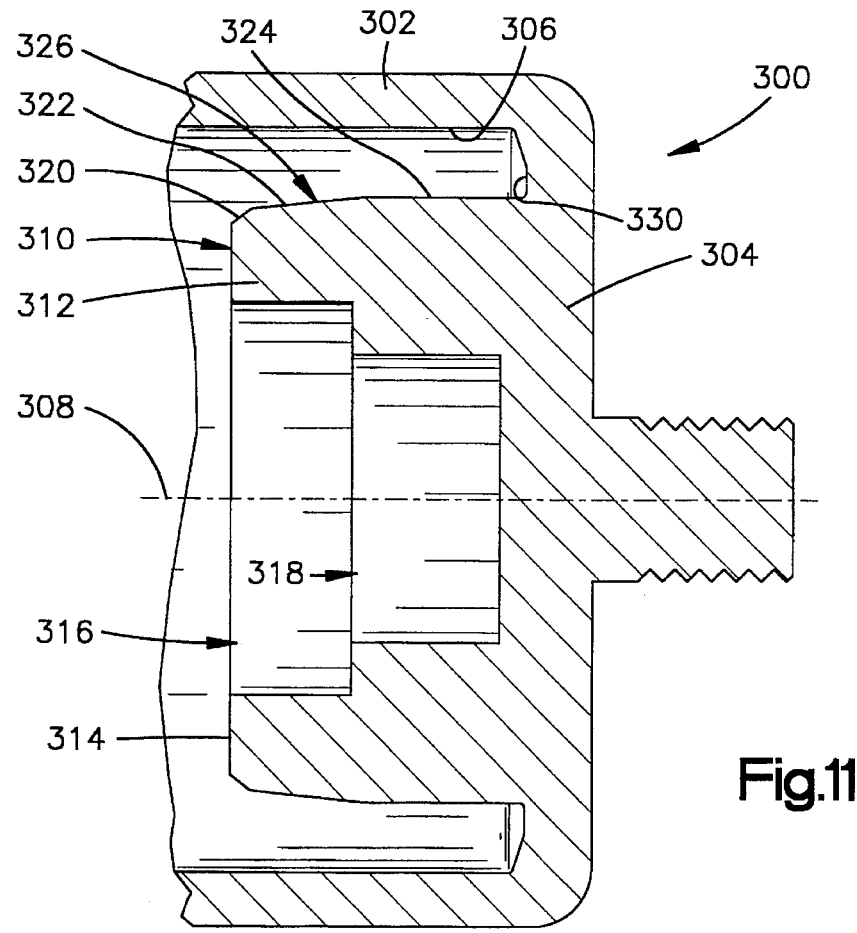
FIG. 11 is a partial sectional view of a part of an apparatus comprising a second embodiment of the present invention.

A second embodiment of the present invention is shown partially in FIG. 11. In second embodiment, the inflator 14 has a substitute housing 300 in place of the housing 50 described above. The housing 300 has a tubular outer wall 302 and a circular end wall 304. The tubular outer wall 302 of the housing 300 is substantially the same as the tubular outer wall 52 of the housing 50, and thus has a cylindrical inner surface 306 centered on a longitudinal central axis 308. The end wall 304 of the housing 300 differs from the end wall 54 of the housing 50 in that the end wall 304 supports a spacer 310 which projects axially from the end wall 304. The spacer 310 is a portion of the housing 300 that functions as a substitute for the separate spacer 140 described above.

The spacer 310 comprises a cylindrical body 312 which is centered on the longitudinal central axis 308 of the housing 300. Like the body 144 of the spacer 140, the body 312 of the spacer 310 has an annular front end surface 314 which defines a circular opening 316 centered on the axis 308. The body 312 also has a central compartment 318 which is open in a direction facing axially outward toward the opening 316. The spacer 310 is thus designed to contain an optional body of auto-ignition material like the body 188 of auto-ignition material contained in the spacer 140.

The spacer 310 further has first, second, and third outer surfaces 320, 322, and 324 which are substantially the same as the first, second, and third outer surfaces 150, 152, and 154 of the spacer 140. Accordingly, the spacer 310 has a chamfered end portion 326. The chamfered end portion 326 directs the inner end portion 180 of the tubular structure 62 (FIG. 3) to become compressively loaded, and compressively deformed, upon axial movement of the inner end portion 180 concentrically between the outer surfaces 320–324 of the body 312 and the inner surface 306 of the tubular outer wall 302.

An annular inner side surface 330 of the end wall 304 surrounds the cylindrical body 312 of the spacer 310. As an optional feature of the present invention, the inner side surface 330 is at least partially frusto-conical, as shown in FIG. 11. In the same manner as described above with reference to the frusto-conical surfaces 150, 152, 320, and 322, the inner side surface 330 causes additional compression of the inner end portion 180 of the tubular structure 62 as the inner end surface 182 of the tubular structure 62 is moved forcefully against the inner side surface 330.

Figure 12:
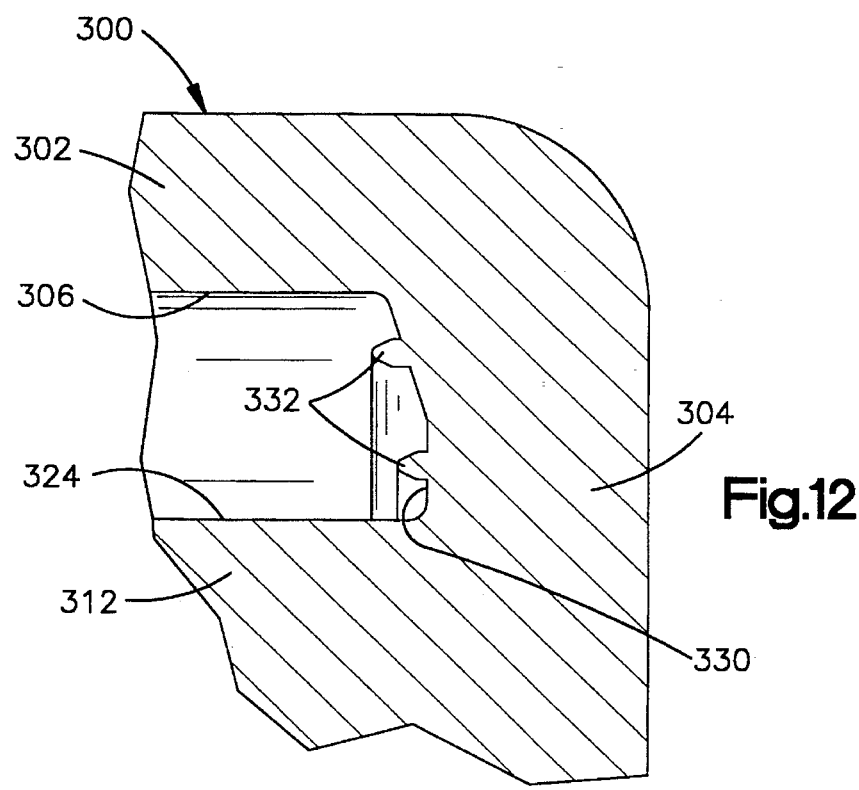
FIG. 12 is an enlarged partial view of the part shown in FIG. 11.

Another optional feature of the present invention is shown in FIG. 12. In accordance with this feature, a pair of sealing members 332 project axially from the inner side surface 330 of the end wall 304 of the housing 300. Preferably, the sealing members 332 are annular ribs which are centered on the axis 308, and are substantially narrower than the radial width of the inner side surface 330. The ribs 332 are thus designed to penetrate the inner end portion 180 of the tubular structure 62 at the inner end surface 182 when the inner end surface 182 approaches the inner side surface 330. Such penetration of the tubular structure 62 by the ribs 332 causes additional axial compression of the filter layers 72–76 (FIG. 4), and thus enhances the sealing effect of the present invention. Although the housing 300 in the second embodiment of the present invention has two of the ribs 332, as shown in FIG. 12, the number and location of such ribs could vary. Similar ribs also could be provided on the flange 146 on the spacer 140 in the first embodiment of the present invention. Moreover, such ribs could establish a seal in accordance with the present invention without the use of an accompanying spacer.

From the above description of the invention, those skilled in the art will perceive improvements, changes and modifications. For example, the chamfered end portions 155 and 326 of the cylindrical bodies 144 and 312 could have surface portions with sizes, shapes, and angles of inclination that differ from those described above. Also, the outer wall 52 and the end wall 54 of the housing 50 could be separate parts rather than being portions of a single part, as could the outer wall 302 and the end wall 304 of the housing 300. Such improvements, changes and modifications within the skill of the art are intended to be covered by the appended claims.

Having described the invention, the following is claimed:

1. Apparatus for inflating an inflatable vehicle occupant restraint, said apparatus comprising:

an ignitable gas generating material which, when ignited, generates gas for inflating the restraint;

igniter means for igniting said gas generating material when said igniter means is actuated;

a housing having a tubular wall surrounding said gas generating material, said tubular wall having a longitudinal central axis and a plurality of outlet openings through which said gas flows radially outward, said housing further having an end wall defining a closed end of said housing;

a tubular structure comprising a cylindrical filter through which said gas flows radially outward from said gas generating material toward said outlet openings, said tubular structure extending coaxially within said tubular wall and having an axially inner end portion adjacent to said end wall; and sealing means for engaging said tubular structure to block gas from bypassing said filter by flowing around said inner end portion of said tubular structure, said sealing means including a pair of opposed sealing surfaces which extend circumferentially around said axis and which face radially toward each other, said inner end portion of said tubular structure being compressively engaged by said sealing surfaces and being compressed between said sealing surfaces.

2. Apparatus as defined in claim 1 wherein said inner end portion of said tubular structure is compressed around the entire circumference of said tubular structure.

3. Apparatus as defined in claim 2 wherein said inner end portion of said tubular structure is compressed both radially and axially.

4. Apparatus as defined in claim 1 wherein said tubular structure has a major portion with an inner diameter, said sealing means comprising a cylindrical body extending concentrically within said tubular wall, said cylindrical body having a chamfered end portion with an outer diameter greater than said inner diameter, said inner end portion of said tubular structure being received concentrically over said cylindrical body and being compressively engaged by said tubular wall and said chamfered end portion of said cylindrical body.

5. Apparatus as defined in claim 4 wherein said inner end portion of said tubular structure is axially compressed between said end wall and said chamfered end portion of said cylindrical body.

6. Apparatus as defined in claim 4 wherein said cylindrical body is a portion of said housing which is supported by said end wall.

7. Apparatus as defined in claim 4 wherein said cylindrical body is a portion of a spacer member, said spacer member being separate from said housing and being received within said housing.

8. Apparatus as defined in claim 7 wherein the material of which said housing is formed is metallic and the material of which said spacer member is formed is non-metallic.

9. Apparatus as defined in claim 1 wherein said tubular structure has an annular inner end surface facing in a direction axially toward said end wall, said sealing means including a sealing member which projects in a direction axially away from said end wall, said sealing member penetrating said tubular structure at said annular inner end surface.

10. Apparatus as defined in claim 9 wherein said sealing member comprises an annular rib centered on said axis.

11. Apparatus as defined in claim 9 wherein said sealing member is a portion of said housing which is supported by said end wall.

12. Apparatus as defined in claim 9 wherein said sealing member is a portion of a spacer member, said spacer member being separate from said housing and being received within said housing.

13. Apparatus for inflating an inflatable vehicle occupant restraint, said apparatus comprising:

an ignitable gas generating material which, when ignited, generates gas for inflating the restraint;

igniter means for igniting said gas generating material when said igniter means is actuated;

a housing having a tubular wall surrounding said gas generating material, said tubular wall having a longitudinal central axis and a plurality of outlet openings through which said gas flows radially outward, said housing further having an end wall defining a closed end of said housing;

a tubular structure comprising a cylindrical filter through which said gas flows radially outward from said gas generating material toward said outlet openings, said tubular structure extending coaxially within said tubular wall and having an axially inner end portion with an annular inner end surface facing in a direction axially toward said end wall; and sealing means for engaging said tubular structure to block gas from bypassing said filter by flowing around said inner end portion of said tubular structure, said sealing means including sealing member which projects in a direction axially away from said end wall, said sealing member penetrating said inner end portion of said tubular structure at said annular inner end surface.

14. Apparatus as defined in claim 13 wherein said sealing member comprises an annular rib centered on said axis.

15. Apparatus as defined in claim 13 wherein said sealing member is a portion of said housing which is supported by said end wall.

16. Apparatus as defined in claim 13 wherein said sealing member is a portion of a spacer member, said spacer member being separate from said housing and being received within said housing.

17. A method of assembling an apparatus for inflating an inflatable vehicle occupant restraint, said method comprising the steps of:

(a) placing a cylindrical tubular structure coaxially within a cylindrical housing;

said tubular structure comprising a cylindrical filter means for filtering gas flowing radially outward through said filter means, said tubular structure having an axially inner end portion;

said housing having a longitudinal central axis, a tubular wall with a plurality of gas outlet openings, and an end wall defining a closed end of said housing, said housing containing sealing means for engaging said tubular structure to block gas from bypassing said filter by flowing around said inner end portion of said tubular structure, said sealing means including a pair of opposed sealing surfaces which extend circumferentially around said axis and which face radially toward each other;

said step of placing said tubular structure within said housing including the step of moving said inner end portion of said tubular structure into contact with said sealing means; and (b) pressing said tubular structure into said housing along said axis so as to move said inner end portion of said tubular structure between said sealing surfaces;

said step of pressing said tubular structure into said housing causing said inner end portion of said tubular structure to become compressively engaged by said sealing surfaces and compressed between said sealing surfaces.

18. A method as defined in claim 17 wherein said step of pressing said tubular structure into said housing causes said inner end portion of said tubular structure to become radially compressed between said sealing surfaces around the entire circumference of said tubular structure.

19. A method as defined in claim 18 wherein said step of pressing said tubular structure into said housing causes said inner end portion of said tubular structure to become axially compressed around the entire circumference of said tubular structure.

20. A method of assembling an apparatus for inflating an inflatable vehicle occupant restraint, said method comprising the steps of:

(a) placing a cylindrical tubular structure coaxially within a cylindrical housing;

said tubular structure comprising a cylindrical filter means for filtering gas flowing radially outward through said filter means, said tubular structure having an axially inner end portion with an annular inner end surface;

said housing having a longitudinal central axis, a tubular wall with a plurality of gas outlet openings, and an end wall defining a closed end of said housing, said housing containing sealing means for engaging said tubular structure to block gas from bypassing said filter by flowing around said inner end portion of said tubular structure, said sealing means including a sealing member which projects in a direction axially away from said end wall;

said step of placing said tubular structure within said housing including the step of moving said annular inner end surface of said tubular structure into contact with said sealing members; and (b) pressing said tubular structure into said housing along said axis so as to move said annular inner end surface of said tubular structure forcefully against said sealing member;

said step of pressing said tubular structure into said housing causing said sealing member to penetrate said inner end portion of said tubular structure at said annular inner end surface.

21. A method as defined in claim 20 wherein said sealing member comprises an annular rib centered on said axis, said step of pressing said tubular structure into said housing causing said inner end portion of said tubular structure to become axially compressed by said sealing member around the entire circumference of said tubular structure.

* * * * *